(12) United States Patent
Collard

(10) Patent No.: US 9,286,184 B1
(45) Date of Patent: Mar. 15, 2016

(54) PROBABILISTIC CORRELATION OF SYSTEM EVENTS WITH PROGRAM INSTRUCTIONS

(75) Inventor: Jean-Francois Collard, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3280 days.

(21) Appl. No.: 11/337,457

(22) Filed: Jan. 23, 2006

(51) Int. Cl.
  *G06F 9/45* (2006.01)
  *G06F 11/34* (2006.01)

(52) U.S. Cl.
  CPC .................................. *G06F 11/3466* (2013.01)

(58) Field of Classification Search
  None
  See application file for complete search history.

(56) References Cited

U.S. PATENT DOCUMENTS

| | | | | |
|---|---|---|---|---|
| 5,450,586 A | * | 9/1995 | Kuzara et al. | 717/124 |
| 6,282,706 B1 | * | 8/2001 | Chauvel et al. | 717/150 |
| 6,754,612 B1 | * | 6/2004 | Vanfladern et al. | 702/186 |

* cited by examiner

*Primary Examiner* — Chuck Kendall
(74) *Attorney, Agent, or Firm* — Potamac Patent Group (57) ABSTRACT

A method and system for associating system events with program instructions in a computer system are disclosed. A program is executed or manually processed to identify instructions which cause system events. Then, markers are inserted into the program, each marker being associated with at least one of the identified instructions. When the program is executed, system events which occur during the execution are associated with program instructions using the markers.

20 Claims, 5 Drawing Sheets

PROBABILISTIC CORRELATION OF SYSTEM EVENTS WITH PROGRAM INSTRUCTIONS

RELATED APPLICATION

This application is related to U.S. patent application Ser. No. 11/030,938, filed on Jan. 7, 2005, entitled "Methods and Systems for Associating System Events With Program Instructions", the disclosure of which is incorporated here by reference.

BACKGROUND

The present invention relates generally to programming techniques and systems and, more particularly, to programming techniques and systems which associate system events with program instructions.

The power of computers to process data continues to grow at a rapid pace. As computing power increases, software applications which are developed for new computing platforms become more sophisticated and more complex. It is not uncommon for teams of software developers to develop applications having hundreds of thousands, or even millions, of lines of software code. With the additional complexity comes additional challenges in terms of, for example, debugging difficulty. In addition to actual syntax errors, debugging can also refer to performance evaluation and improvement, e.g., to identify portions of the software code which can be improved so that the program as a whole runs faster.

Various techniques can be used to detect, and identify, the source(s) of performance problems in computer systems. According to one technique, a profile can be generated which monitors the execution time associated with various code portions (routines) of a program. Those routines having a relatively high percentage of the overall execution time can then be flagged for performance review. This technique assumes, sometimes erroneously, that performance problems can be identified by inspecting the routines with the highest percent of execution time.

Another technique for evaluating program performance employs performance counters in processor hardware to count the number of inefficient operations of a specific kind (that kind being decided by the user) performed by the processor during execution of a program. Since the processor has access to a program counter, which provides a numeric index to program instructions, individual instructions causing problems may be identified. This method, however, is limited to detecting problems occurring within the processor and not on a system-wide basis since only the processor has access to the program counter. Thus, for example, inefficiencies associated with program instructions which are largely executed outside of the processor cannot be easily identified using such techniques. Using performance counters in system components other than the processor is problematic since it is then difficult (or impossible) to correlate inefficiencies with specific program instructions since other system components typically do not have access to the program counter.

Accordingly, it would be desirable to provide systems and methods for identifying and associating performance problems with program instructions on a system-wide basis.

SUMMARY

Systems and methods according to the present invention address this need and others by providing techniques for identifying and associating system events with program instructions on a system-wide basis.

According to one exemplary embodiment of the invention, a method for inserting markers into a program includes the steps of executing a program to identify instructions that can cause system events, and inserting markers into the program, each marker being associated with at least one of the identified instructions.

According to another exemplary embodiment of the invention, a method for associating a system event with a program instruction that caused the system event, includes the steps of executing a program including markers; and associating a system event which occurs during the executing step with at least one instruction in the program based on an associated one of the markers.

According to yet another exemplary embodiment of the present invention, a processing system includes at least one processor, and at least one system component, having at least one associated recording structure, connected to the processor, wherein the at least one processor submits instructions and markers to the system component, the system component detects an event and records the event and information associated with at least one of the markers in the at least one associated recording structure.

BRIEF DESCRIPTION OF THE DRAWINGS

The accompanying drawings, which are incorporated in and constitute a part of the specification, illustrate an embodiment of the invention and, together with the description, explain the invention. In the drawings.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Figure 1:
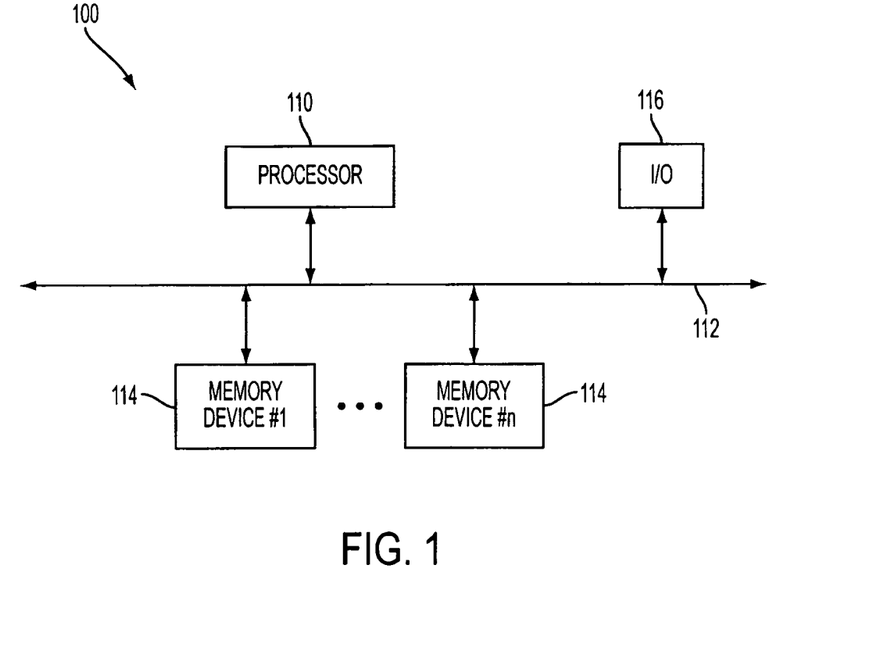
FIG. 1 illustrates a processing system in which exemplary embodiments of the present invention can be employed.

Prior to discussing techniques for associating systems events with program instructions according to exemplary embodiments of the present invention, an exemplary system in which such techniques can be implemented is described below in order to provide some context. With reference to FIG. 1, a processing system 100 includes at least one processor 110 connected to various system components via an interconnect 112. Specifically, various memory devices 1 . . . n (114) are connected to processor 110 via interconnect 112 (for example, a bus), as well as one or more input and output devices 116. For simplification of the drawing, only a few system components are depicted, however those skilled in the art will appreciate that processing system 100 will typically include many additional components. With respect to the memory devices 114, these can include, for example, cache memory, RAM, ROM, floppy disk, hard disk, optical disk, or any other memory device on which a program can be stored. I/O devices 116 can include, for example, a keyboard, a display, a printer, a scanner, a digital camera, a microphone, a mouse or any other I/O device. The system 100 can be a personal computer, a server or a mainframe computer, for example. Different types of systems can be used to implement exemplary embodiments of the present invention and system 100 is intended to be purely illustrative. Although only one processor 110 is shown in FIG. 1, it will be understood that the present invention is equally applicable to multiprocessor systems.

Processors, including general purpose microprocessors and digital signal processors (DSPs), are ubiquitous in today's society. At a fundamental level, microprocessors perform functions by executing instructions. The set of instructions which a particular processor is designed to respond to is called its instruction set. Processor instruction sets include commands to the microprocessor to, e.g., load values in registers, store values from registers to locations in main memory, add, subtract, multiply or divide values stored in registers or other storage locations, compare shift register contents and perform a variety of control operations, including testing and setting bits, outputting data to a port, pushing data to a stack and popping stack contents. The functionality of processor 110 also includes the ability to detect or observe events occurring within or encountered by the processor 110. Such events may include, for example, cache misses, full queues, the type of coherence requests generated to service the particular instruction being executed by the processor 110, etc. Those skilled in the art will appreciate that the term "events" as used in this specification includes the aforementioned occurrences as well as other system occurrences, including (but not limited to) those which are of interest for software developers in monitoring program performance to, e.g., eliminate program execution bottlenecks.

One object of the present invention is to correlate a system event observed by a system component with, for example, the address of one or more executed instructions which caused (or is likely to have caused) the event. For example, if a system component detects a cache miss, an instruction which caused (or is likely to have caused) the cache miss is identified. The phrase "caused or is likely to have caused" reflects the probabilistic nature of techniques in accordance with the present invention and, as used in this specification hereafter, the term "caused" means "caused or is likely to have caused".

Exemplary embodiments of the present invention illustrate techniques which identify application instructions which cause events seen by a system component (e.g., chipset). Using coherence traffic as an exemplary event, it has been determined that most coherence requests from a processor are caused by load and store instructions that missed in all cache levels of that processor. A processor or simulator can test a program using, for example, performance monitors that indicate how many times a specific load or store instruction (specified by its program counter) missed in cache during execution. This information may also be known to the programmer, since he or she is typically aware of the behavior of the application. Load and store instructions that are known to have missed or to have missed often in previous executions of a program being analyzed in accordance with the present invention are probably those that will generate coherence traffic in future runs. These missed load and store instructions are designated herein as distinguished instructions and are recognized by a system component as event causes based on markers inserted into the program, as will now be discussed with respect to the flowchart of FIG. 2.

Figure 2:
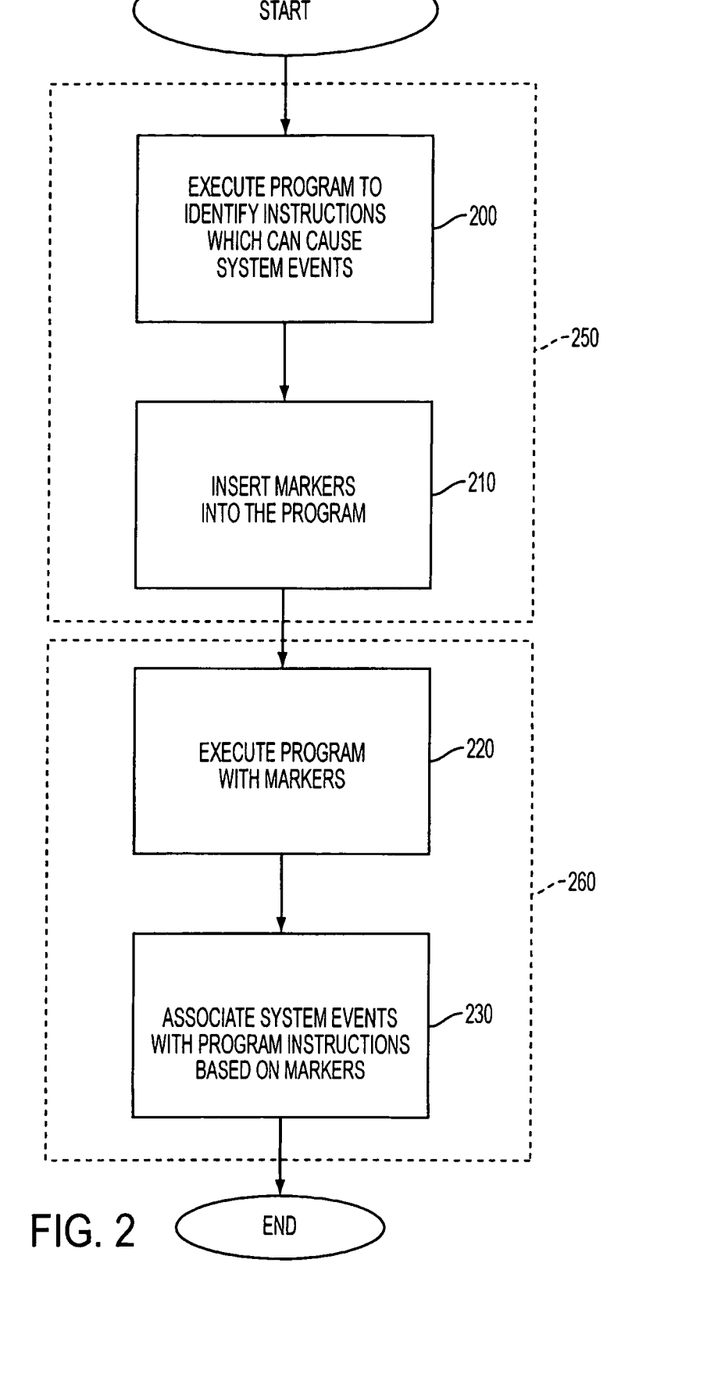
FIG. 2 illustrates a method for associating system events according to an exemplary embodiment of the present invention.

Therein, a method for associating a system event with a program instruction that caused that system event according to an exemplary embodiment of the present invention, can be generally subdivided into two phases: a marking phase 250 (denoted by a first dotted block) and an execution phase 260 (denoted by a second dotted block). During the marking phase 250, step 200, which is optional, and step 210 are performed to generate a program including markers associated with distinguished instructions. During the execution phase 260, programs with markers are executed as step 220 and system events are associated with instructions which caused them using the markers at step 230. Each of these steps will now be discussed in more detail.

To initiate the marking phase 250, a program may be initially executed to identify distinguished instructions which cause system events at step 200. Step 200 may include one test run or multiple test runs of a program being marked. The program can be executed on a software simulator or on hardware during the marking phase 250. According to one exemplary embodiment, these distinguished instructions are either load or store instructions that missed the cache memory. However, those skilled in the art will appreciate that other events can be monitored, resulting in other types of instructions being designated as distinguished instructions. For simplification purposes an instruction is said herein to miss the cache memory if it misses in all cache levels. Since the data set(s) used during the marking phase 250 are not necessarily similar to those used during the execution phase 260, the manner in which instructions are identified as distinguished instructions based on cache misses can vary. For example, the program being analyzed can be executed once during step 210 and any load or store instruction that causes a cache miss can be designated as a distinguished instruction. Alternatively, the program which is being analyzed can be executed a number of times during step 210 with different data sets and load or store instructions which cause more than a predetermined number of cache misses, e.g., two misses for three runs, can be designated as a distinguished instruction. Other relationships between detected system events and the identification of specific program instructions as distinguished can also be used as alternatives or in addition to the foregoing.

Once distinguished instructions have been identified, markers are inserted into the program at step 210. Markers are used to delineate blocks of program instructions and can, for example, be implemented as integer values which are inserted between program statements. Within each block of code, a single distinguished instruction is presumed to cause a system event that occurs during execution of that block. Thus each marker (or marker pair) is associated with a single distinguished instruction (or dynamic instance of a distinguished instruction) and provides a mechanism for a system component to associate a detected event with a particular program instruction as described below. For example, a pair of markers can delineate an block of code which includes a single distinguished instruction. An event that occurs while that block of program code is being executed is presumed to have been caused by the distinguished instruction between the two markers. An exemplary method of inserting markers within a program is described below and illustrated in the flowchart of FIG. 3.

Figure 3:
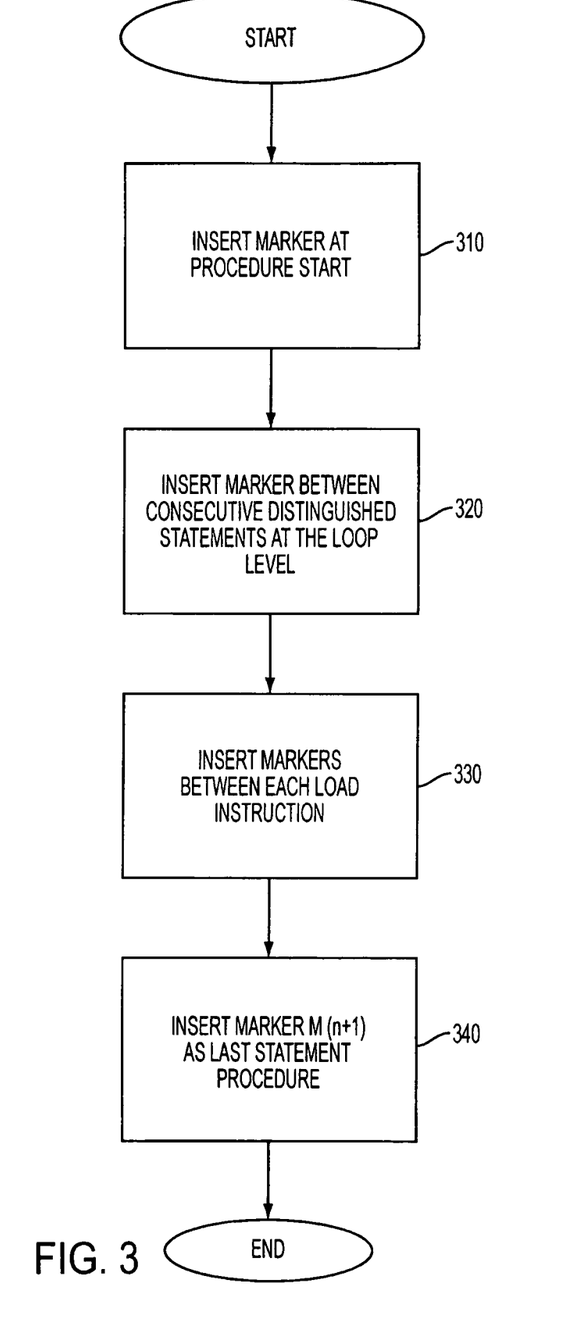
FIG. 3 illustrates a method for inserting markers according to an exemplary embodiment of the present invention.
Figure 5:
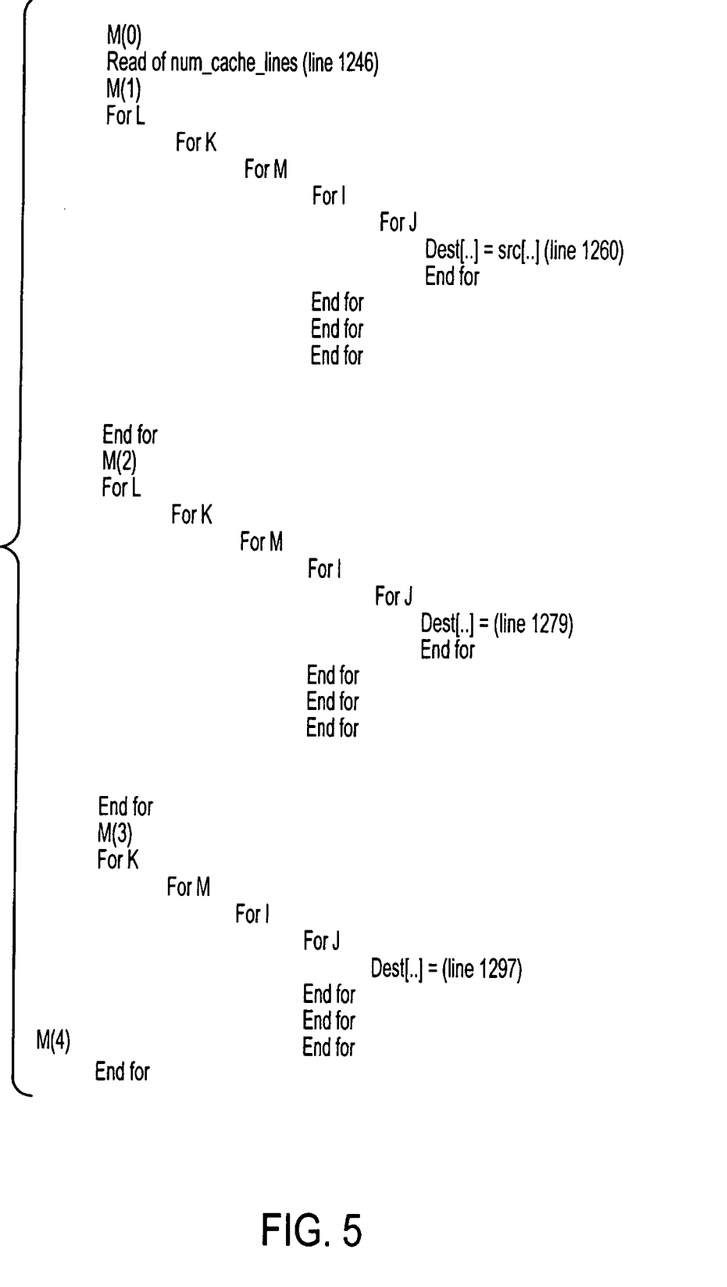
FIG. 5 illustrates program code with markers according to an exemplary embodiment of the present invention.

Therein, a marker M(0) is initially inserted as the first statement of the program at step 310. Distinguished load or store statements are denoted as S(i), S(2), . . . S(n) in this example and these distinguished statements can be numbered in the order that they appear in the program. For each pair of consecutive distinguished statements (denoted S(i), S(i+1), etc.), a marker M(i) is inserted between S(i) and S(i+1) at the loop level surrounding both statements at step 320. According to this exemplary embodiment of the present invention, each distinguished statement includes at most one write operation, and if there is a write operation associated with the distinguished statement, the write operation comes after all read operations. To ensure that this characteristic is present, each distinguished statement is examined in turn, with each assembly instruction needed to translate the distinguished statement into executable form determined. If the assembly instructions associated with a particular distinguished statement contain more than one load, additional markers m1, m2, etc., are inserted between those assembly instructions at step 330. This feature of exemplary embodiments of the present invention enables multiple loads within a distinguished statement to be contrasted by the system component so that a detected system event can be associated with a respective load operation. After the program is marked in this way, a last marker M(n+1) is inserted as the last statement of the program at step 340. An example of a marked program based on this exemplary embodiment of the present invention is shown in FIG. 5.

Marking in step 210 can also take into account loops and loop levels of a program being analyzed according to exemplary embodiments of the present invention. A loop iterates the statements contained in its body; a loop body can contain one or more other loops, creating a loop nest. The loop level of a statement is the number of loops that surround that statement. The following code example is provided to illustrate loop levels.

For I=1 to N
    For J=1 to M
      Statement S(1)
    End For
      Statement S(2)
    End For
    Statement S(3)

Therein, the loop level of statement S(1) is 2, that of statement S(2) is 1, and that of statement S(3) is 0. If a marker was to be inserted between statement S(1) and statement S(2), e.g., because both statements S(1) and S(2) were previously identified as distinguished statements, then that marker would be inserted in the body of the I-loop, since the I-loop surrounds both statement S(1) and statement S(2), and after the end of the J-loop for the marker to be at the loop level surrounding both statements. Additionally, the marker would be inserted before statement S(2), since it should be inserted between statement S(i) and statement S(i+1). A marker may also separate two run-time (dynamic) instances of the identified instructions. Consider for example the case of a program instruction that causes many system events and happens to be in a loop construct; inserting a marker anywhere in the loop construct triggers, at execution time, an alternation of instances of the marker and instances of the identified instruction.

According to another exemplary embodiment of the present invention, markers can have unique values even within program loops in order to identify which instance of a distinguished instruction caused a particular event. For example, markers can be provided as follows:

Statement 1;
    Marker 1;
    For X=1 to 100 do
    Statement 2;
    Marker 2-X
    End for In this way, an execution of this program code may occur during which the following log of markers and events are tracked and recorded (in order): Marker 1, Marker 2-1, Marker 2-2, Marker 2-3, EVENT, Marker 2-4, etc. This log would inform a user or debugger software that the fourth instance of distinguished Statement 2 has caused this particular system event.

Once the program is marked, subsequent executions during the execution step 220 of execution phase 260, will result in the system component seeing a sequence of coherence (read or write) requests and markers, where markers unambiguously delineate blocks of transactions generated by each processor. The marked program can be executed on the same system as was used during the marking phase 250 or on a different system. A more detailed example of the steps associated with the execution phase 260 according to an exemplary embodiment of the present invention will now be described with respect to the flow chart of FIG. 4.

Figure 4:
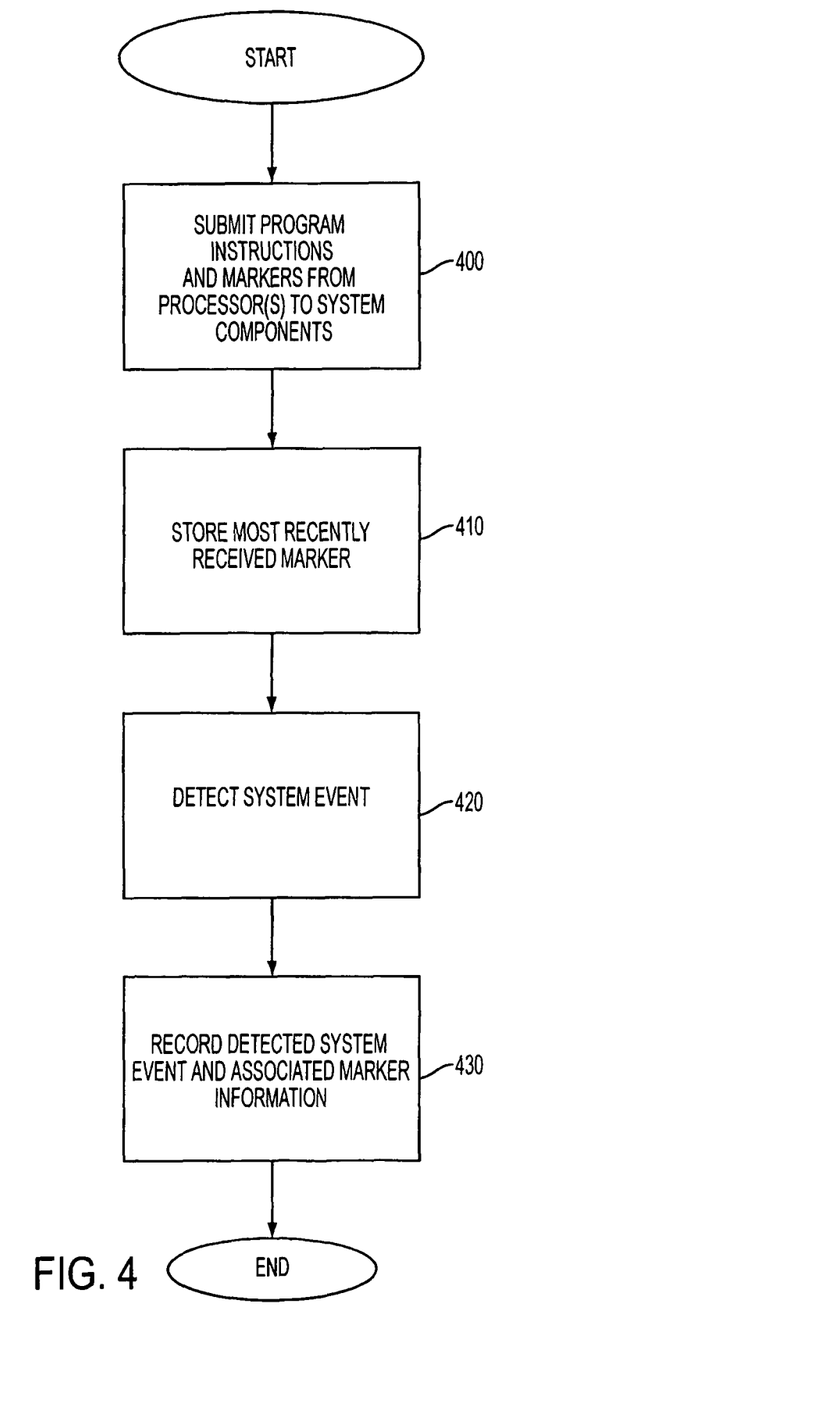
FIG. 4 illustrates a method for associating and recording system events according to an exemplary embodiment of the present invention.

Therein, program instructions and markers are submitted from processor 110 to a system component at step 400. The most recently received marker is stored by the system component at step 410. In some exemplary embodiments, the system component may retain previously received and stored markers in addition to the marker most recently received from the processor. In a multiprocessor embodiment, the system component will store, for each processor in the system, the value of the most recent marker received, e.g., using a dedicated memory location per processor in which to store markers. Thus, markers can, for example, be implemented by storing agreed-upon values at predetermined memory locations. Using an uncacheable location to store markers ensures that the store implementing is never completed locally (in one of the processor's caches) and is therefore always observed by the system component and, accordingly, may be desirable for some exemplary embodiments of the present invention.

As mentioned above, the marker value can be an integer, which represents the unique ID of the marker; for example, instead of storing M(0), M(1), the integer values 42, 43, etc, can be stored making sure that no two markers from in any two procedures have the same ID. The identity of the emitting processor is usually carried by coherence traffic, so it may be unnecessary for markers to indicate processor ID information. However, according to another exemplary embodiment of the present invention, the markers can include additional information such as the identity of the emitting processor.

System events are detected by the system component during execution of program instruction(s) at step 420. The detected system event and information associated with the identified program instruction are recorded at step 430. Various techniques can be used to record information associated with events and associated instructions as described for example, in the above-incorporated by reference, related patent application. According to one exemplary embodiment of the present invention, the same software that installs the markers during the marking phase 250 can also record the marker value and the detected system event during the execution phase 260. This will enable future correlation between the marker and the associated distinguished instruction, either manually or via a debugging script.

According to other exemplary embodiments of the present invention, the identification of program instructions which caused system events is not limited to the use of marker information, but can also take into account properties of the instructions under consideration themselves. This enables, among other things, for fewer markers to be inserted into the program being analyzed. For example, consider the following exemplary program code:

Marker 1;
    Store at address 0;
    Load from address A;

Store at address B;
Marker 2;

Assume that all three of the instructions in the above code (i.e., first store, load and second store) have been determined a priori to be distinguished instructions. The earlier described exemplary embodiments of the present invention may have marked this code by inserting a marker between the first store and load and another marker between the load and the second store. However this exemplary embodiment employs the properties of the instructions themselves to avoid inserting these markers.

For example, further assume that execution of this program code yields the following exemplary log of information: Marker 1; EVENT: WRITE REQUESTED AT ADDRESS X; Marker 2. Based on this log of information, step 230 of the exemplary method described above can be performed as follows. First, the load instruction can be discarded as a candidate instruction which caused the event, since the event is a WRITE request. Second, although marker 1 and marker 2 provide insufficient information to unambiguously identify either the first store or the second store as causing the event, there are several ways to handle the ambiguity. One option is to report both the first store and the second store as potential instructions which caused this system event. Another option is to perform additional analysis on the relationship between address X and the addresses associated with the store instructions. If, for example, the value of B is greater than 0, then it can be determined that the second store instruction caused the reported system event. Thus this exemplary embodiment of the present invention illustrates how it may not be necessary to delineate each and every distinguished instruction by distinct markers. Instead a combination of markers and program property knowledge can be used.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The foregoing description of exemplary embodiments of the present invention provides illustration and description, but it is not intended to be exhaustive or to limit the invention to the precise form disclosed. For example, multiple processors may be involved in the system described. Each of the processors may be running multiple processes or threads. Additionally, although techniques are described above are described using coherence traffic as a reference example, those skilled in the art will appreciate that the probabilistic methodology can be applied to other types of traffic. The following claims and their equivalents define the scope of the invention.

The invention claimed is:

1. A method for inserting markers into a program comprising the steps of:
executing a program to identify instructions that can cause system events; and
inserting markers into said program, each marker being associated with at least one of said identified instructions.

2. The method of claim 1, wherein at least one of said markers separates two execution-time instances of said at least one identified instruction with which it is associated.

3. The method of claim 1, wherein said step of inserting markers further comprises the step of:
inserting a marker as the first or last statement of a procedure within said program.

4. The method of claim 2, wherein said markers each have a unique value such that a marker placed within a loop of said program has a first value during a first iteration of said loop and a second value during a second iteration of said loop, said first value being different than said second value.

5. The method of claim 1, wherein said step of inserting markers further comprises the step of:
inserting a marker between each pair of consecutive identified instructions.

6. The method of claim 1, wherein said step of executing a program to identify instructions further comprises the step of:
executing said program a plurality of times using a plurality of different data sets and identifying those instructions which cause system events at least more than a predetermined number of times as said instructions which can cause system events.

7. The method of claim 1, wherein said step of executing a program to identify instructions further comprises the step of:
executing said program once and identifying instructions which cause system events as said instructions which can cause system events.

8. A method for associating a system event with a program instruction that caused the system event, comprising the steps of:
executing a program to identify one or more instructions that can cause the system event, wherein the program includes markers; and
associating a system event which occurs during said executing step with at least one instruction in said program based on an associated one of said markers.

9. The method of claim 8, wherein said step of associating further comprises the step of:
associating said system event with said at least one instruction based also on a property associated with said at least one instruction.

10. The method of claim 8, wherein said system event is a cache miss.

11. The method of claim 8, further comprising the step of storing a most recently received marker in an uncacheable memory location.

12. The method of claim 8, wherein a value stored in each of said markers is an integer.

13. The method of claim 8, further comprising the step of:
recording an identification of a processor associated with said system event.

14. The method of claim 8, wherein software correlates markers with an associated system event.

15. A processing system comprising:
at least one processor; and
a memory comprising instructions executable by the processor to:
execute a program to identify instructions that can cause system events; and
insert markers into said program, each marker being associated with at least one of said identified instructions.

16. The system of claim 15, wherein at least one of said markers separates two execution-time instances of said at least one identified instruction with which it is associated.

17. The system of claim 16, wherein said step of inserting markers further comprises the step of inserting a marker as the first or last statement of a procedure within said program.

18. The system of claim 17, wherein said markers each have a unique value such that a marker placed within a loop of said program has a first value during a first iteration of said loop and a second value during a second iteration of said loop, said first value being different than said second value.

19. The system of claim 15, wherein said step of inserting markers further comprises the step of:
   inserting a marker between each pair of consecutive identified instructions.

20. The system of claim 19, wherein, wherein said step of executing a program to identify instructions further comprises the step of:
   executing said program a plurality of times using a plurality of different data sets and identifying those instructions which cause system events at least more than a predetermined number of times as said instructions which can cause system events.

* * * * *